United States Patent [19]

Condon

[11] 4,235,503
[45] Nov. 25, 1980

[54] FILM PROJECTION LENS SYSTEM FOR 3-D MOVIES

[76] Inventor: Chris J. Condon, 16606 Oakview Dr., Encino, Calif. 91436

[21] Appl. No.: 903,932

[22] Filed: May 8, 1978

[51] Int. Cl.³ .............................................. G02B 27/26
[52] U.S. Cl. ...................................... 350/1.2; 350/132; 352/57; 352/60
[58] Field of Search .................... 350/1.2, 132; 352/57, 352/60, 62, 59, 63, 65, 148

[56] References Cited

U.S. PATENT DOCUMENTS

| 2,845,843 | 8/1958 | Lutes | 350/132 X |
| 3,893,750 | 7/1975 | D'Amato | 350/189 |

*Primary Examiner*—Paul A. Sacher
*Attorney, Agent, or Firm*—Allan M. Shapiro

[57] ABSTRACT

Dual projection lens systems are housed together to project adjacent stereo images onto a screen in stereoscopic position relationship. An ultra-violet filter is positioned on the optical axis of each lens system, and toward the screen a separate polarizer is positioned on each axis to provide polarized images to be seen by the viewer through binocular-polarized eyepieces. Heat sinks are attached to the filters for removing heat.

5 Claims, 3 Drawing Figures

U.S. Patent    Nov. 25, 1980    4,235,503
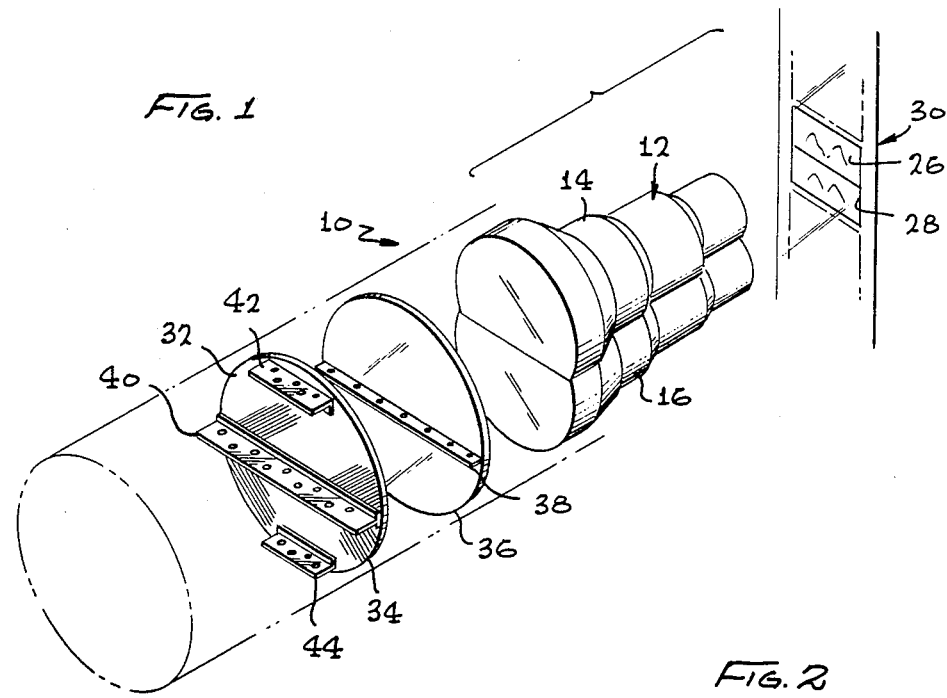
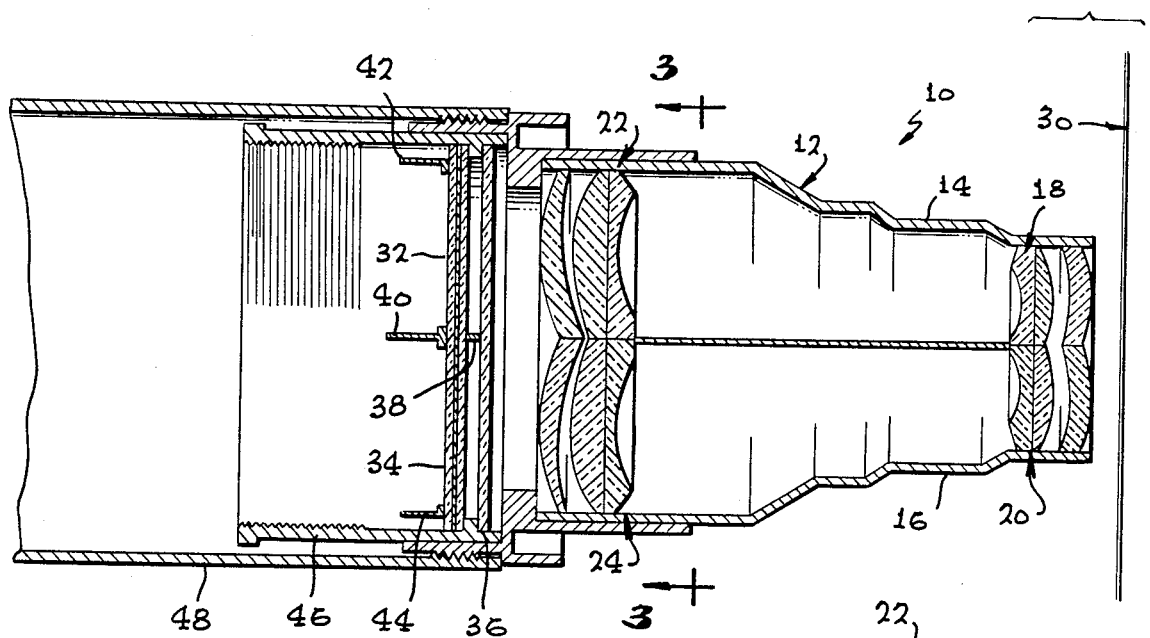
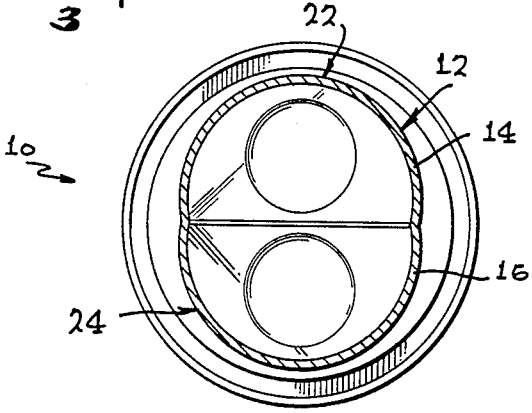

FILM PROJECTION LENS SYSTEM FOR 3-D MOVIES

BACKGROUND OF THE INVENTION

1. Field of the Invention

This invention is directed to a projection lens system for the projection of apparent 3-dimensional images from film, such as movie film, and includes structure for improving the life of such a system.

2. Description of the Prior Art

The production of images which give the impression of 3-dimensional depth have been the subject of considerable interest and accomplishment over the years for photography. The original stereopticon set forth the basic requirement: two images separately seen by the two eyes and differing in detail to give the impression of a 3-dimensional structure.

In projection systems for 3-dimensional imaging, coding of the overlapped images on the screen is required to permit the viewer's eyes to see the two images separately to obtain the 3-dimensional effect. Early coding was done with color, with one of the images coded with red, and the other blue so that red and blue filters in front of the respective eyes would separate the images for separate interpretation. An advantage of that system is that no special projector is needed. One color film can contain all of the information on one frame. The tremendous disadvantage of not being able to project images with colors of reality prevented such a system from being any more than a novelty.

Present-day polarizers have overcome that difficulty so that full color stereo images can be projected, and polarized binocular viewing devices can be employed for separating the images. This invention is directed to a projection lens system of improved life for the projection of movie images.

SUMMARY OF THE INVENTION

In order to aid in the understanding of this invention, it can be stated in essentially summary form that it is directed to a film projection lens system for 3-dimensional image projection wherein the lens system has two adjacent optical paths, and there is ultra-violet filtration means on these paths to reduce the ultra-violet component of the projected image. Toward the screen along these paths are polarizers arranged at an angle with respect to each other so that the images projected along the two optical paths are differently polarized.

It is thus an object of this invention to provide a film projection lens system for 3-dimensional image projection which has an improved life. It is another object to provide a projection lens system for projecting images along adjacent optical axes wherein polarizers are placed along the axes and an ultra-violet filter protects each polarizer so as to reduce the degradation of the quality of the polarizer by reducing the ultra-violet effect on the polarizers. It is a further object to optionally provide structure attached to the polarizers in a projection lens system for 3-dimensional images where the devices remove heat from the polarizing structure to keep the polarizer temperature as low as possible to improve its life.

The features of the present invention which are believed to be novel are set forth with particularity in the appended claims. The present invention, both as to its organization and manner of operation, together with further objects and advantages thereof, may be understood best by reference to the following description taken in conjunction with the accompanying drawings.

BRIEF DESCRIPTION OF THE DRAWINGS

FIG. 1 is a schematic isometric view of the film projection lens system for 3-dimensional projection of this invention, with portions of the lens barrel removed and shown in dashed lines.

FIG. 2 is a longitudinal section through the projection lens system of this invention taken along the two optical axes, and with a portion of the lens barrel broken away.

FIG. 3 is a section taken generally along the line 3—3 of FIG. 2.

DESCRIPTION OF THE PREFERRED EMBODIMENT

The film projection lens system of this invention is generally indicated at 10 and is seen in FIGS. 1, 2 and 3. Lens system 10 has primary lens barrel 12 which is formed of upper and lower lens barrel portions, each of which has sections which are cylindrical and conical about an axis. These portions are joined along a common chord, with the chords separating them into upper barrel portion 14 and lower barrel portion 16. Lens group 18 forms a primary lens group in the upper barrel portion, while group 20 forms a corresponding primary lens group in the lower portion. The primary groups could be called oculars, since they have that function. Similarly, group 22 forms an objective lens group in the upper barrel portion with group 24 forming an objective lens group in the lower barrel portion. The primary and objective lens groups form optical axes of appropriate optical properties so that images 26 and 28 on film 30, when illuminated from the rear, are projected on paths through lens system 10. The upper image is projected along an upper path through the lens system with the upper axis, and the lower image is projected along a lower path through the lower portion of the lens system. The differences in the images are such that, when the images are visually separated by the two eyes of the viewer, the impression of a 3-dimensional structure is achieved. The primary lens group and the objective lens group may each be anamorphic to achieve divergent axes between the lens groups to permit the larger objective lens sizes shown.

The two images are separately coded by being passed through the separate polarizing filters 32 and 34, with one filter positioned on each image path in front of the corresponding objective lens groups 22 and 24, respectively. These polarizing filters provide the coding of the separate images by which the images can be visually separated, as seen on the screen. For this purpose, polarizing filters 32 and 34 are arranged at 90 degrees with respect to each other for polarization of the two images at right angles to each other.

Ultra-violet light tends to degrade or reduce the life of such polarizing filters. To enhance the life of the polarizing filters, ultra-violet filter 36 is positioned to pass the images before they reach the polarizing filters. Ultra-violet filter 36 is designed to filter out the longer wave energy beyond the visible spectrum. In order to dissipate the ultra-violet energy absorbed in ultra-violet filter 36, heat sink-radiator 38 is secured thereto. Heat sink 38 conducts heat radially away to the lens mount and radiates heat. It can be in the form of a T and is secured to the face of the ultra-violet filter by means of heat conducting epoxy cement, or equivalent material. Ultra-violet filter 36 thus reduces the ultra-violet and total energy impinging upon the polarizing filters 32 and 34.

Polarizing filters 32 and 34 are also equipped with heat sink-radiators. Heat sink 40 is secured across the polarizing filter structure between the filters 32 and 34. It serves as a dividing line between the two polarizing areas, which are oppositely polarized as described above. Furthermore, heat sinks 42 and 44 are respectively secured to the upper edge of filter 32 and the lower edge of filter 34 outside of the image path thereof. Heat sink 40 is T-shaped, while heat sinks 42 and 44 are L-shaped. Each is secured to the filter structure by heat-conducting epoxy or equivalent material to absorb heat from the polarizing filter structure and to conduct and radiate it away. Heat sinks 38, 40, 42 and 44 are metal bars, as shown in FIGS. 1 and 2, and may be perforated along the web, but the flange by which it is attached to the adjacent structure is of full area to maximize adhesive attachment and maximize heat transfer to the heat sink.

The removal of ultra-violet energy by means of ultra-violet filter 36 improves the life of polarizing filters 32 and 34 by two significant means. First of all, the heat in the ultra-violet portion has been removed before the image reaches the polarizing filters. Secondly, the ultra-violet rays themselves have been removed to substantial extent, and these rays cause degradation of the quality of the polarizing material. Thus, by removing most of the ultra-violet rays, the polarizing material is not reduced in life by burn-out of that nature. Furthermore, the temperature of the polarizing filters 32 and 34 is held at a lower level by the removal of heat from the polarizing filters by heat sinks 40, 42 and 44. For these reasons, life is improved. Lens tubes 46 and 48 house the filter and heat sink structures.

It will be noted that, by rotating the entire lens assembly 90 degrees from the position illustrated and as described, the lens assembly can be used to project stereo pairs that are positioned side-by-side as well as the "above and below" system illustrated. Suitable anamorphic optics can be incorporated at the end of the lens tube 48 to "unsqueeze" either the side-by-side or the above-below stereo images. In all cases, the optical centers of each lens should correspond to the "stereo center" of each stereo image so that the necessary overlay of the images will result on the projection screen.

In order to achieve the best defined image edge for each of the images of the stereo pair, a special projector aperture plate having a septum separating the images is suggested. This will result in a sharp masking being cast on the screen and will minimize "bleed over", thus improving the quality of the projected images.

The spacing between the two objective lenses can be made variable by suitable adjustment device so that "stereo pairs" having various center spacings can be projected. A suitable auxiliary lens or lens system having variable power can also be incorporated to achieve variation of the optical centers, and a moving lens system positioned in front of the lens system can be used to vary the optical centers of the lens system to correspond to the optical centers of the stereo pairs.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A film projection lens system comprising:
lens elements defining first and second adjacent image projection paths to provide image paths from an illuminated image to a screen;
first and second polarizing filters respectively positioned along said first and second image paths, said polarizing filters being positioned to differently polarize images on said first and second paths;
ultra-violet filter means positioned on both of said paths and positioned between said polarizing filters and the illuminated image for reducing the ultra-violet rays along the image paths impinging on the polarizing filters to reduce ultra-violet degradation of the polarizing filters; and
a heat sink attached to said ultra-violet filter means to remove heat therefrom.

2. A film projection lens system comprising:
lens elements defining first and second adjacent image projection paths to provide image paths from an illuminated image to a screen;
first and second polarizing filters respectively positioned along said first and second image paths, said polarizing filters being positioned to differently polarize images on said first and second paths;
ultra-violet filter means positioned on both of said paths and positioned between said polarizing filters and the illuminated image for reducing the ultra-violet rays along the image paths impinging on the polarizing filters to reduce ultra-violet degradation of the polarizing filters; and
a heat sink secured to said polarizing filters for removing heat from said polarizing filters.

3. The film projection lens system of claim 2 wherein a heat sink is also attached to said ultra-violet filter means to remove heat therefrom.

4. The film projection lens system of claim 3 wherein said heat sinks are metal bars, and said metal bars are attached by adhesive to receive heat.

5. The film projection lens system of claim 4 wherein said lens elements are positioned in a lens tube, and said polarizing filters and said ultra-violet filter are positioned in a lens tube.

* * * * *